United States Patent [19]

Horne et al.

[11] 4,104,808
[45] Aug. 8, 1978

[54] SEMI-AUTOMATIC CRITICAL POINT DRYING APPARATUS

[76] Inventors: John E. Horne, 6001 34th Ave., Hyattsville, Md. 20782; Stephen A. Van Albert, 12620 Springloch Ct., Silver Spring, Md. 20904; A. J. Tousimis, 11504 Stonewood La., Rockville, Md. 20852

[21] Appl. No.: 823,793

[22] Filed: Aug. 11, 1977

[51] Int. Cl.² ............................................ F26B 19/00
[52] U.S. Cl. .................................... 34/243 R; 34/45; 34/66
[58] Field of Search ...................... 34/45, 66, 243 R; 250/311

[56] References Cited

U.S. PATENT DOCUMENTS

| 2,903,589 | 9/1959 | Ladd et al. | 250/311 X |
| 3,650,038 | 3/1972 | Alessi et al. | 34/45 |

OTHER PUBLICATIONS

Pfefferkorn, Proceedings of the Third Annual Scanning Electron Microscope Symposium, IIT Research Institute, Chicago, Ill., Apr. 1, 1970, pp. 89 to 96.
Spicer et al., Proceedings of the Seventh Annual Scanning Electron Microscope Symposium, IIT Research Institute, Chicago, Ill., Apr. 1, 1974, pp. 299 to 304.

*Primary Examiner*—Leland A. Sebastian
*Attorney, Agent, or Firm*—Sughrue, Rothwell, Mion, Zinn and Macpeak

[57] ABSTRACT

A semi-automatic critical point drying apparatus for the preparation of biological or organic specimens for examination thereof by scanning electron microscopy. In the preparation of such specimens, the specimen is placed in a chamber into which is introduced a transitional fluid, such as liquid $CO_2$, which replaces the dehydrating liquid in the specimen as a part of the drying process. In critical point drying, the transitional fluid in the chamber is heated to elevate the chamber temperature and pressure above the critical point of the fluid. A five-way indicator valve replaces the manually adjustable valve of prior art apparatus for enabling the operator easily to control the cooling, filling, purging and bleeding operations of such a critical point drying apparatus.

3 Claims, 2 Drawing Figures

SEMI-AUTOMATIC CRITICAL POINT DRYING APPARATUS

CROSS-REFERENCE TO RELATED APPLICATION

Ser. No. 672,923, filed Apr. 2, 1976, now U.S. Pat. No. 4,055,904, for "Automatic Critical Point Drying Apparatus", and assigned to the same assignee as the present application.

BACKGROUND OF THE INVENTION

1. Field of the Invention

This invention relates to the field of critical point dryers for the preparation of biological and organic specimens for examination by electron microscopy, and more particularly to a semi-automatic critical point dryer.

2. Description of the Prior Art

In prior art manual critical point dryers, the operator was required manually to adjust a conventional two-way exhaust valve in order to obtain the proper flow rate for the very critical purge and bleed modes of the dryer operation. A skilled operator was required properly to make this valve adjustment in order to avoid damage to the specimen being dried.

SUMMARY OF THE INVENTION

The broad object of the invention is to provide a relatively inexpensive, semi-automatic critical point dryer which will permit the unskilled or semi-skilled operator accurately to control the purge and bleed modes, which are the two most critical operations in critical point drying.

Briefly, this object is achieved by replacing the manually adjustable exhaust valve of prior art manual critical point dryers with flow regulators and a five-position indicator valve which may merely be dialed by the operator to the required mode position in order to achieve the proper, predesigned flow rate for each mode of operation of the dryer.

DETAILED DESCRIPTION OF THE PREFERRED EMBODIMENT

In the above co-pending Application, there is described in detail the technique of preparing organic and biological specimens by the use of transitional fluids, such as liquid $CO_2$, and also the technique of critical point drying, and in particular the modes or stages of operation required in a critical point dryer; that application is expressly incorporated herein by reference.

A requirement of a critical point dryer is that the chamber in which the specimen and transitional fluid are placed must be heated and pressurized to values above the critical point of the transitional fluid.

Figure 1:
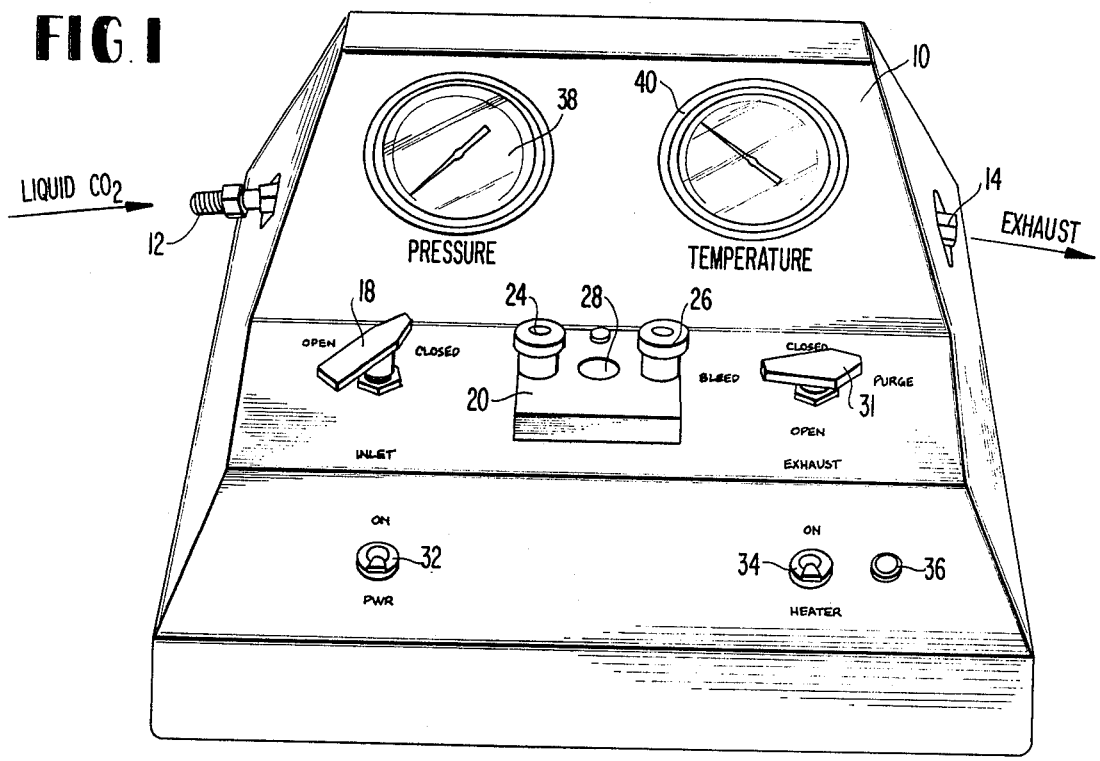
FIG. 1 is a plan view of the console of a preferred embodiment of a semi-automatic critical point drying apparatus in accordance with the invention.

FIG. 1 illustrates a preferred embodiment of the present invention and in particular the console thereof. The console includes a housing 10, an inlet port 12 and an outlet port 14. The $CO_2$ transitional fluid enters and leaves the dryer through these ports.

The inlet port 12 is connected to a two-way inlet valve 16 (FIG. 2) controlled by a two-position control knob 18 which permits the inlet valve to be moved between its CLOSED and OPEN positions.

Figure 2:
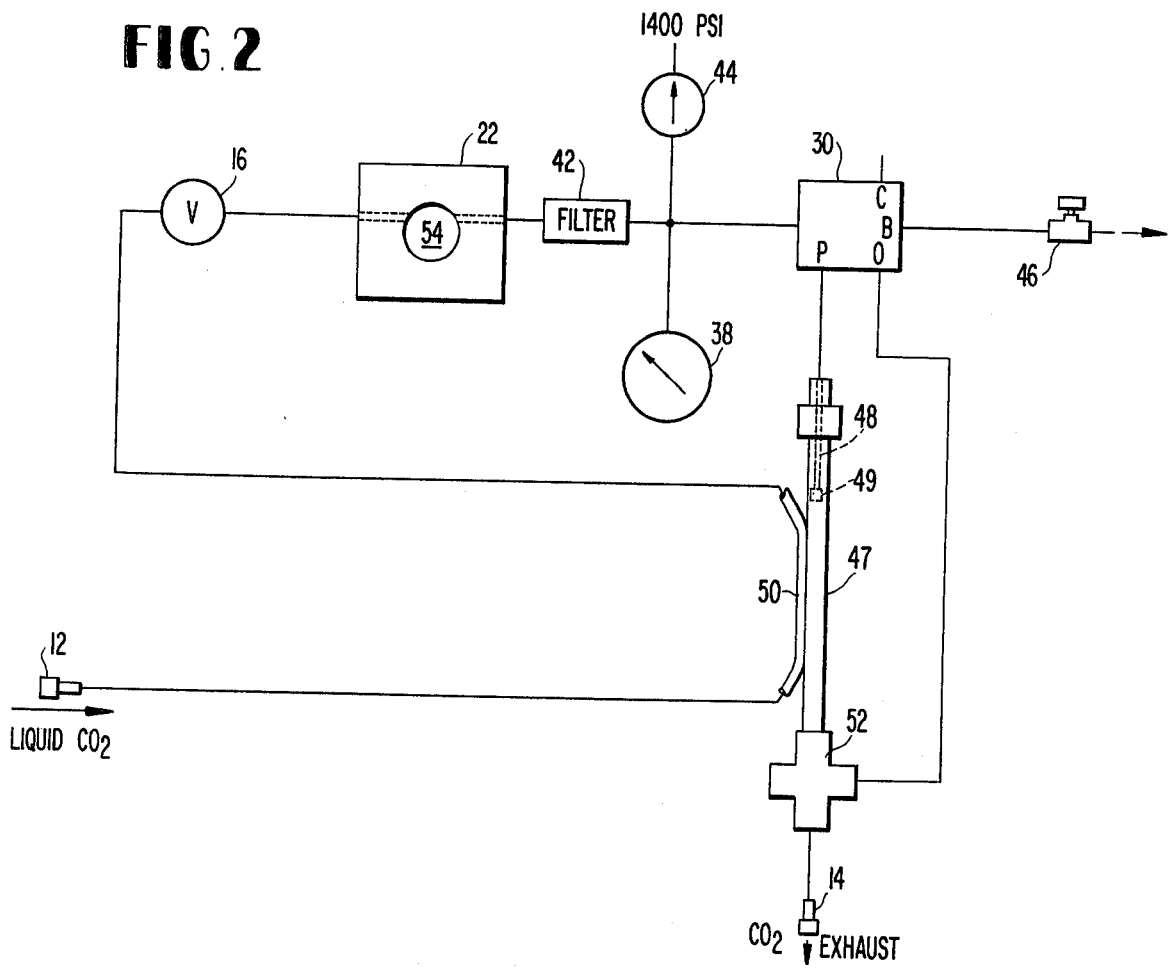
FIG. 2 is a fluid flow diagram illustrating the operation of this preferred embodiment.

Shown in FIG. 1 is the cover 20 of the specimen chamber 22 (FIG. 2). The cover is secured and sealed to the chamber by the tightening nuts 24 and 26. The top of the cover includes a glass viewing plate 28 through which the specimen may be observed. Coupled between the chamber 22 and the exhaust port 14 is a five-way valve 30 having an inlet and four control positions labelled OPEN (EXHAUST), PURGE, CLOSED, and BLEED. The position of valve 30 is controlled by a control knob 31 which the operator merely dials to the desired position.

A power switch 32 is moved to its ON position to apply electrical power to the dryer, and a heater switch 34 is moved to its ON position to energize an internal heater (not shown). Pilot light 36 is illuminated when the heater is ON.

A pressure gauge 38 indicates the pressure of the specimen chamber 22, and a temperature gauge 40 indicates the temperature of the chamber.

FIG. 2 is a schematic diagram showing the internal flow of the $CO_2$ transitional fluid through the critical point dryer. In addition to the elements already enumerated, there are also shown a filter 42, a pressure release valve 44, a pre-set bleed valve 46 acting as a flow restriction, an evaporator section 47 containing a flow restrictor 48, a heat exchanger 50, and a three-way fluid coupler 52.

In operation of the critical point dryer, inlet port 12 is connected to a source (not shown) of liquid $CO_2$. The inlet valve 16 is turned by the control knob 18 to its OPEN position, and the five-way exhaust valve 30 is also dialed to its OPEN ("O") position. The apparatus is now in its cooling mode, and the liquid $CO_2$ enters inlet port 12, passes through the heat exchanger 50 and the inlet valve 16 into the chamber 22 and through its specimen cavity 54, and continues out of the chamber 22 through the filter 42, the valve 30, the coupling 52 and out the exhaust port 14. The purpose of this cooling mode in a critical point drying operation is to cool the chamber 22 to a temperature which will condense the transitional fluid to be added later.

The inlet valve 16 is then closed, and then the five-way exhaust valve 30 is dialed to its closed ("C") position. The cover 20 is removed, and the specimen is then placed in the cavity 54 of the pressure chamber 22, the specimen having previously been dehydrated and saturated with a dehydrating liquid, such as acetone or ethanol.

The chamber is then filled with liquid $CO_2$ by opening the inlet valve 16 by turning knob 18 to the OPEN position. When it is observed that the chamber 22 is full so that the specimen is completely immersed, the exhaust valve 30 is dialed by the operator to the PURGE ("P") position in order to purge the specimen of the dehydrating fluid, replacing the dehydrating fluid in the specimen with the liquid $CO_2$.

Of course, since a typical specimen is quite fragile, it is important that the rate of flow of the $CO_2$ through the chamber be kept below a desired maximum value to prevent damage to the specimen. As will be seen from FIG. 2, when five-way valve 30 is in the PURGE or "P" position, the liquid $CO_2$ flows from the valve and through the evaporator section 47 containing a flow restrictor 48 which maintains the flow rate at or below the desired maximum value. Restrictor 48 has on its outlet a spray head 49 containing two small orifices which spray the $CO_2$ into the evaporator section.

During the PURGE mode of operation, the liquid $CO_2$ vaporizes in the evaporator section 47 and cools the incoming liquid $CO_2$ via the heat exchanger 50. The $CO_2$ passing through the evaporator section 47 then flows through the coupling 52 and is exhausted as a gas to the atmosphere at exhaust port 14.

After a predetermined time, the PURGE mode is terminated by closing the inlet valve 16 and dialing the exhaust valve 30 to its CLOSED ("C") position. Then, the switch 34 is moved to its ON position to energize an electric heater (not shown) to heat the chamber and raise the interior chamber temperature and pressure to values above the critical temperature and pressure of the liquid $CO_2$, i.e., above 31° C and 1072 psi, respectively.

If the pressure should inadvertently increase to as high as 1400 psi, then pressure release valve 44 operates to vent the chamber to the atmosphere, thereby maintaining the chamber pressure at a maximum value of 1400 psi. The chamber temperature may also be thermostatically controlled to prevent damage to the specimen by excessive temperature, but, as a practical matter, such a high temperature would not be reached before operation of the pressure relief valve. The operator observes the pressure indicator 38 and temperature indicator 40, and when the pressure and temperature have exceeded the critical values, indicating that the critical point of the liquid $CO_2$ has been reached, the operator then dials the five-way valve 30 to its BLEED ("B") position in order slowly to bleed off the pressure in the chamber 22 to the atmosphere through a flow restriction in the form of the preset bleed valve 46. The pressure must be relieved very slowly so as not to damage the fragile specimen in the chamber. Since the pressure and temperature of the chamber are above the critical points for $CO_2$, there is no phase boundary between the liquid and gaseous phases of the $CO_2$, whereby, as the chamber pressure is slowly reduced, the carbon dioxide can be removed as a gas without affecting the three-dimensional specimen morphology.

When the operator reads zero pressure on the pressure indicator 38, critical point drying has been accomplished, and the specimen is completely dry and devoid of water, dehydrating fluid and transitional fluid, and the specimen may be removed from the chamber.

This semi-automatic critical point dryer, and in particular the five-way valve 30 with the flow restrictions coupled to its PURGE and BLEED ports, permit greater accuracy of control of the flow rates during the critical PURGE and BLEED operations by an unskilled or semi-skilled operator. By contrast, in the prior art manual critical point dryers, the operator was required carefully to adjust the opening of a single two-way exhaust valve. In other words, the operator had to be quite skillful in selecting the exact valve opening between fully open and fully closed in order to adjust the flow rates so that the fragile specimen would not be damaged.

We claim:

1. In a critical point dryer apparatus for preparing a specimen for examination by electron microscopy, said sample being saturated with a dehydrating fluid which is to be replaced by a transitional fluid which in turn is to be removed from the specimen by critical point drying while preserving the three-dimensional morphology of the specimen, said apparatus including a pressure chamber for receiving the specimen, means for precooling the chamber with the transitional fluid, means for filling the chamber with the transitional fluid in liquid form, means for purging the specimen of the dehydrating fluid, and replacing the dehydrating fluid with the transitional fluid, means for elevating the temperature and pressure of the chamber above the critical temperature and pressure of the transitional fluid, and means for removing the transitional fluid as a gas by bleeding off the chamber pressure until the chamber is at atmospheric pressure, said chamber having an inlet through which the transitional fluid enters the chamber and an outlet through which the transitional fluid leaves the chamber, the improvement comprising:

a manually controllable multi-way valve having an input port connected to the outlet of the chamber and at least a PURGE output port and a BLEED output port, and flow restriction means in communication with said PURGE and BLEED output ports for controlling the flow rates of the transitional fluid through the chamber during the purging of the specimen and the bleeding of the chamber, respectively, thereby preventing damage to the specimen by excessively high flow rates of the transitional fluid.

2. The improvement as defined in claim 1 wherein said multiple-way valve further comprises a CLOSED outlet port for sealing the outlet of the chamber during filling and pressurizing of the chamber, and an OPEN outlet port for permitting the transitional fluid to flow at a maximum flow rate through the chamber during precooling of the chamber.

3. The improvement as defined in claim 2 further comprising pressure relief valve means for venting the chamber to the atmosphere when the chamber pressure reaches a predetermined maximum value.

* * * * *